US009083647B2

(12) United States Patent
Olgaard

(10) Patent No.: US 9,083,647 B2
(45) Date of Patent: Jul. 14, 2015

(54) SYSTEM AND METHOD FOR DYNAMIC SIGNAL INTERFERENCE DETECTION DURING TESTING OF A DATA PACKET SIGNAL TRANSCEIVER

(71) Applicant: LITEPOINT CORPORATION, Sunnyvale, CA (US)

(72) Inventor: Christian Volf Olgaard, Saratoga, CA (US)

(73) Assignee: LITEPOINT CORPORATION, Sunnyvale, CA (US)

( * ) Notice: Subject to any disclaimer, the term of this patent is extended or adjusted under 35 U.S.C. 154(b) by 133 days.

(21) Appl. No.: 14/087,584

(22) Filed: Nov. 22, 2013

(65) Prior Publication Data

US 2015/0149839 A1 May 28, 2015

(51) Int. Cl.
*H04B 17/00* (2015.01)
*H04B 3/46* (2015.01)
*H04L 12/26* (2006.01)
*H04W 24/08* (2009.01)
*H04B 17/29* (2015.01)

(52) U.S. Cl.
CPC ............. *H04L 43/50* (2013.01); *H04W 24/08* (2013.01); *H04B 17/29* (2015.01)

(58) Field of Classification Search
CPC .............................. H04B 17/29; H04W 24/08
USPC .......... 714/712, 715, 799, 811, 819; 375/224; 455/67.16, 16.11, 16.12, 17.14
See application file for complete search history.

(56) References Cited

U.S. PATENT DOCUMENTS

| 8,312,329 | B1 * | 11/2012 | Yellapantula et al. ......... 714/704 |
| 8,537,942 | B2 * | 9/2013 | Olgaard et al. ............... 375/346 |
| 8,588,763 | B2 * | 11/2013 | Venkataraman .............. 455/423 |
| 8,917,761 | B2 * | 12/2014 | Huynh .......................... 375/224 |
| 2010/0321702 | A1 | 12/2010 | Froggatt et al. |
| 2011/0096821 | A1 | 4/2011 | Olgaard |
| 2013/0295858 | A1 | 11/2013 | Olgaard |
| 2013/0301694 | A1 | 11/2013 | Olgaard |

FOREIGN PATENT DOCUMENTS

WO 2008013705 A2 1/2008

OTHER PUBLICATIONS

International Search Report and Written Opinion, filed in PCT/US2014/064995 issued on Feb. 6, 2015, 9 pgs.

* cited by examiner

*Primary Examiner* — Christine Tu
(74) *Attorney, Agent, or Firm* — Vedder Price, P.C.

(57) ABSTRACT

A system and method for testing multiple wireless data packet signal transceiver devices under test (DUTs) with dynamic signal interference compensation. Transmit data packets originating from other DUTs are monitored during receive signal testing of a selected DUT for concurrent occurrences of transmit and receive data packets. From this, it can be determined whether a failure to receive a responsive data packet, such as an acknowledgement, from the selected DUT is likely due to interference from a transmit data packet from another DUT being at least substantially concurrent with the receive data packet to which the selected DUT was expected to respond. If so, one or more receive data packets can be added to the receive signal sequence to extend the test and determine an accurate packet error rate (PER) without requiring a repeat of the full test.

18 Claims, 2 Drawing Sheets

SYSTEM AND METHOD FOR DYNAMIC SIGNAL INTERFERENCE DETECTION DURING TESTING OF A DATA PACKET SIGNAL TRANSCEIVER

BACKGROUND

The present invention relates to testing data packet signal transceivers, and in particular, to testing a data packet signal transceiver device under test (DUT) in the presence of signal interference from one or more other DUTs.

Many of today's electronic devices use wireless signal technologies for both connectivity and communications purposes. Because wireless devices transmit and receive electromagnetic energy, and because two or more wireless devices have the potential of interfering with the operations of one another by virtue of their signal frequencies and power spectral densities, these devices and their wireless signal technologies must adhere to various wireless signal technology standard specifications.

When designing such wireless devices, engineers take extra care to ensure that such devices will meet or exceed each of their included wireless signal technology prescribed standard-based specifications. Furthermore, when these devices are later being manufactured in quantity, they are tested to ensure that manufacturing defects will not cause improper operation, including their adherence to the included wireless signal technology standard-based specifications.

For testing these devices following their manufacture and assembly, current wireless device test systems typically employ testing subsystems for providing test signals to each device under test (DUT) and analyzing signals received from each DUT. Some subsystems (often referred to as "testers") include at least a vector signal generator (VSG) for providing the source signals to be transmitted to the DUT, and a vector signal analyzer (VSA) for analyzing signals produced by the DUT. The production of test signals by the VSG and signal analysis performed by the VSA are generally programmable (e.g., through use of an internal programmable controller or an external programmable controller such as a personal computer) so as to allow each to be used for testing a variety of devices for adherence to a variety of wireless signal technology standards with differing frequency ranges, bandwidths and signal modulation characteristics.

As part of the manufacturing of wireless communication devices, one significant component of production cost is costs associated with these manufacturing tests. Typically, there is a direct correlation between the cost of test and the sophistication of the test equipment required to perform the test. Thus, innovations that can preserve test accuracy while minimizing equipment costs (e.g., increasing costs due to increasing sophistication of necessary test equipment, or testers) are important and can provide significant costs savings, particularly in view of the large numbers of such devices being manufactured and tested.

One technique being used to reduce costs and time associated with manufacturing test is to test multiple DUTs concurrently by assembling and connecting one or more testers with additional signal routing circuitry (e.g., power dividers, power combiners, signal switches, multiplexors, etc.) as needed for providing receive (RX) signals to the DUTs and for receiving and analyzing transmit (TX) signals produced by the DUTs. In such a manufacturing test environment, the testers and DUTs will all be emitting radio frequency (RF) signals, often concurrently, thereby resulting in significant likelihood of signal interference. For example, a signal from the tester intended for one DUT may be erroneously received and acted upon by another DUT. Alternatively, signals generated by multiple DUTs may interfere with one another, as well as cause the tester to erroneously identify such signals as valid or invalid when, in fact, the opposite is true, notwithstanding the use of various signal shielding mechanisms to keep such signals mutually isolated.

For example, when interference by a signal to or from one DUT causes a data packet signal received by a second DUT to be identified as "bad", that second DUT will indicate a packet error. However, such an error indication would be a false negative caused by the interfering packet, thereby causing the measured packet error rate (PER) to appear higher than the actual PER. In the event that the measured PER becomes high enough to cause the test to fail, it is then generally necessary for the test system to repeat the test, or identify the DUT as defective. However, due to the interference, such a measured PER is inaccurate and not truly indicative of a problem with the DUT. Accordingly, the repetition of the test is unnecessary and introduces additional testing costs due to the time needed to repeat the test, or introduces even greater costs by erroneously identifying the DUT as defective.

Accordingly, it would be desirable to be able to detect instances of signal interference in real time and take simple remedial steps to prevent inaccurate test measurements that otherwise would result in prolonged and unnecessarily repeated testing, and erroneous identifications of DUTs as defective.

SUMMARY

In accordance with the presently claimed invention, a system and method are provided for testing multiple wireless data packet signal transceiver devices under test (DUTs) with dynamic signal interference compensation. Transmit data packets originating from other DUTs are monitored during receive signal testing of a selected DUT for concurrent occurrences of transmit and receive data packets. From this, it can be determined whether a failure to receive a responsive data packet, such as an acknowledgement, from the selected DUT is likely due to interference from a transmit data packet from another DUT being at least substantially concurrent with the receive data packet to which the selected DUT was expected to respond. If so, one or more receive data packets can be added to the receive signal sequence to extend the test and determine an accurate packet error rate (PER) without requiring a repeat of the full test.

In accordance with one embodiment of the presently claimed invention, a system for testing multiple wireless data packet signal transceiver devices under test (DUTs) with dynamic signal interference compensation includes:

a plurality of data packet signal paths for communicating with a plurality of DUTs by conveying a corresponding plurality of transmit data packet signals from the plurality of DUTs and a receive data packet signal to the plurality of DUTs, and including signal routing circuitry responsive to one or more path control signals by conveying, via a selected one of the plurality of data packet signal paths, a selected one of the plurality of transmit data packet signals from a selected one of the plurality of DUTs and conveying the receive data packet signal to the selected one of the plurality of DUTs, and signal measurement circuitry coupled to the signal routing circuitry and responsive to the plurality of transmit data packet signals by providing one or more measurement signals indicative of reception of respective ones of the plurality of transmit data packet signals; and test circuitry coupled to the plurality of data packet signal paths to receive the plurality of transmit data packet signals and provide the receive data packet signal with at least a predetermined number of data packets, and responsive to the one or more measurement signals by including one or more additional data packets in the receive data packet signal following the one or more measurement signals being indicative of reception, substantially coincident with a current data packet of the receive data packet signal, of at least one data packet of one or more of the plurality of transmit data packet signals from other than the selected one of the plurality of DUTs, and a failure to receive a data packet of the selected one of the plurality of transmit data packet signals corresponding to the current data packet of the receive data packet signal.

In accordance with another embodiment of the presently claimed invention, a method of testing multiple wireless data packet signal transceiver devices under test (DUTs) with dynamic signal interference compensation includes:

providing a plurality of data packet signal paths for communicating with a plurality of DUTs by conveying a corresponding plurality of transmit data packet signals from the plurality of DUTs and a receive data packet signal to the plurality of DUTs;

responding to one or more path control signals by conveying, via a selected one of the plurality of data packet signal paths, a selected one of the plurality of transmit data packet signals from a selected one of the plurality of DUTs and conveying the receive data packet signal to the selected one of the plurality of DUTs;

responding to the plurality of transmit data packet signals by providing one or more measurement signals indicative of reception of respective ones of the plurality of transmit data packet signals;

receiving the plurality of transmit data packet signals;

providing the receive data packet signal with at least a predetermined number of data packets; and responding to the one or more measurement signals by including one or more additional data packets in the receive data packet signal following the one or more measurement signals being indicative of reception, substantially coincident with a current data packet of the receive data packet signal, of at least one data packet of one or more of the plurality of transmit data packet signals from other than the selected one of the plurality of DUTs, and a failure to receive a data packet of the selected one of the plurality of transmit data packet signals corresponding to the current data packet of the receive data packet signal.

DETAILED DESCRIPTION

Figure 1:
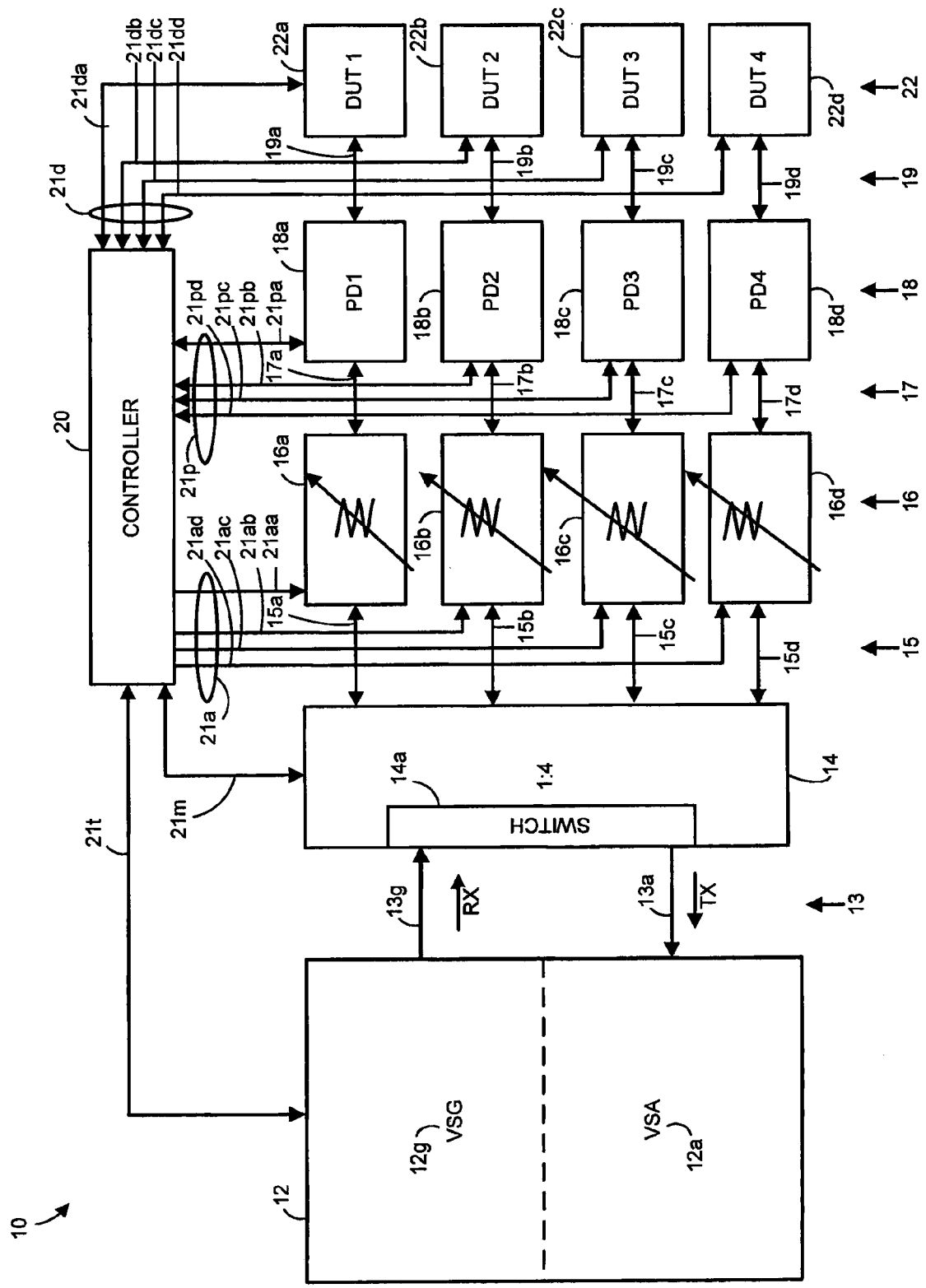
FIG. 1 depicts a testing environment for testing a data packet signal transceiver device under test (DUT) in the presence of signal interference from one or more other DUTs in accordance with an exemplary embodiment of the presently claimed invention.

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed. Moreover, to the extent that the figures illustrate diagrams of the functional blocks of various embodiments, the functional blocks are not necessarily indicative of the division between hardware circuitry.

As discussed in more detail below, in accordance with exemplary embodiments of the presently claimed invention, it is possible to detect instances of likely signal interference in real time and alert a tester to ignore one or more current test results and take remedial measures to compensate for the possible interference error. For example, the number of test data packets provided during a test can be increased to provide an additional opportunity for the DUT to receive the desired number of data packets. As a result, if the DUT is, in fact, not defective, the slightly extended test can be successful and avoid need for otherwise unnecessary repetition of the test. Accordingly, the validity of measured test results is increased while minimizing test time and cost.

As also discussed in more detail below, signal power detection subsystems are connected between the DUTs and the tester to monitor the DUT transmit (TX) signals and identify respective times of packet start and cessation, and duration of the packet. Such data packet signal information allows for determination of whether and when a data packet is sent by a second DUT during a time interval during which a first DUT is supposed to be actively receiving a test packet from the tester. In such event, if the tester receives no confirmation packet response to the test packet it had sent, it would ordinarily identify a RX error. However, if the test system was able to see another packet on a neighboring test signal path was sent during that test packet reception time interval, then the test system can infer that interference may have occurred, ignore that single test instance and add another test packet to the previously predetermined number of test packets. The added time for this would simply be the time needed for sending an additional data packet, which would be a considerable savings in time as compared to a complete repetition of the test when the error, which otherwise appears likely to have been caused by interference, has pushed the PER beyond a prescribed limit, or even greater likely costs incurred by erroneously identifying a DUT as defective.

Referring to FIG. 1, a testing environment 10 in accordance with an exemplary embodiment of the presently claimed invention includes a tester 12, signal routing circuitry 14, power measurement circuitry 18 and control circuitry 20, interconnected substantially as shown, for testing multiple DUTs 22. Additionally, programmable attenuation circuits 16 can be included, as desired, for controlling signal levels between the routing circuitry 14 and power measurement circuitry 18. In this example, the testing environment 10 is configured for testing four DUTs 22a, 22b, 22c, 22d. However, it will be readily appreciated from this discussion that such testing environment 10 can be scaled as desired to test fewer or more DUTs 22 as desired.

The tester 12 generally includes a signal source, such as VSG 12g, for providing DUT receive signals RX, and signal analysis circuitry, such as a VSA 12a, for capturing and analyzing DUT transmit signals TX. The tester 12, signal routing circuitry 14, signal attenuation circuitry 16, power measurement circuits 18 and DUTs 22 are mutually interconnected by respective signal paths 13, 15, 17, 19 (e.g., coaxial RF cables and connectors) in accordance with well-known principles. The signal attenuators 16 are programmable and are helpful in compensating for variances in signal losses among the respective signal paths to and from the DUTs 22, and can be used to ensure that the receive signals RX provided to the respective DUTs 22 are at the desired signal levels in accordance with the signal standard being tested.

A signal switch 14a is also included, e.g., as part of the signal routing circuitry 14, for enabling connectivity between either the tester signal source 12g or receiver 12a and the DUTs 22. Alternatively, such signal switch 14a can be included as part of the tester 12. Further alternatively, multiple signal switches 14a can be included as part of the tester 12 with corresponding sets of signal routing circuitry 14 and attenuators 16, e.g., one for the VSG 12g and another for the VSA 12a, thereby allowing the VSG 12g and VSA 12a to be separated as distinct tester subsystems and subject to more individualized control by the controller 20.

The controller 20 can also be part of the tester 12, or can be a separate subsystem co-located with or remote from (e.g., communicating via a network) the remainder of the testing environment 10. The controller 20 communicates with the tester 12, signal routing circuitry 14, signal attenuators 16, power measurements circuits 18 and DUTs 22 via respective control signal interfaces 21t, 21m, 21a, 21p, 21d. Accordingly, the controller 20 can provide control for the signal source 12g and receiver 12a of the tester 12, enable and disable the various signal path connections provided by the signal routing circuitry 14, program the respective signal attenuation levels of the signal attenuators 16, receive power measurement data from the power measurement circuits 18 (e.g., indicative of the start time, duration and end time of the DUT TX data packets), and control the DUTs 22 (e.g., programming the respective test modes of the DUTs 22).

For example, the first DUT 22a can be tested, while the second DUT 22b is being loaded (e.g., via its control interface 21db from the controller 21), the third DUT 22c is being booted, and the fourth DUT 22d is ready to be tested next. Hence, most if not all DUTs 22 can be kept active nearly constantly in some testing activity, e.g., some preparing for transmit testing while others are performing receive testing, thereby enabling multiple tests to progress concurrently.

Alternatively, the controller 20 can be separated into multiple controller units, e.g., one control system 20t (not shown) for the tester 12 and one or more control systems 20d (not shown) for the DUTs 22. An implementation using multiple controllers could benefit even more from the presently claimed invention. For example, a single controller 20 implementation in which the controller 20 controls both the tester 12 and the DUTs 22 would likely be more aware of the respective states of the tester 12 and various DUTs 22 and, therefore, more easily succeed in avoiding testing operations resulting in interference. However, with multiple independent controllers, e.g., operating asynchronously, each controller is unlikely to maintain sufficient awareness of the respective states of the tester 12 and various DUTs 22 and, therefore, be more likely to foster testing operations resulting in interference.

Figure 2:
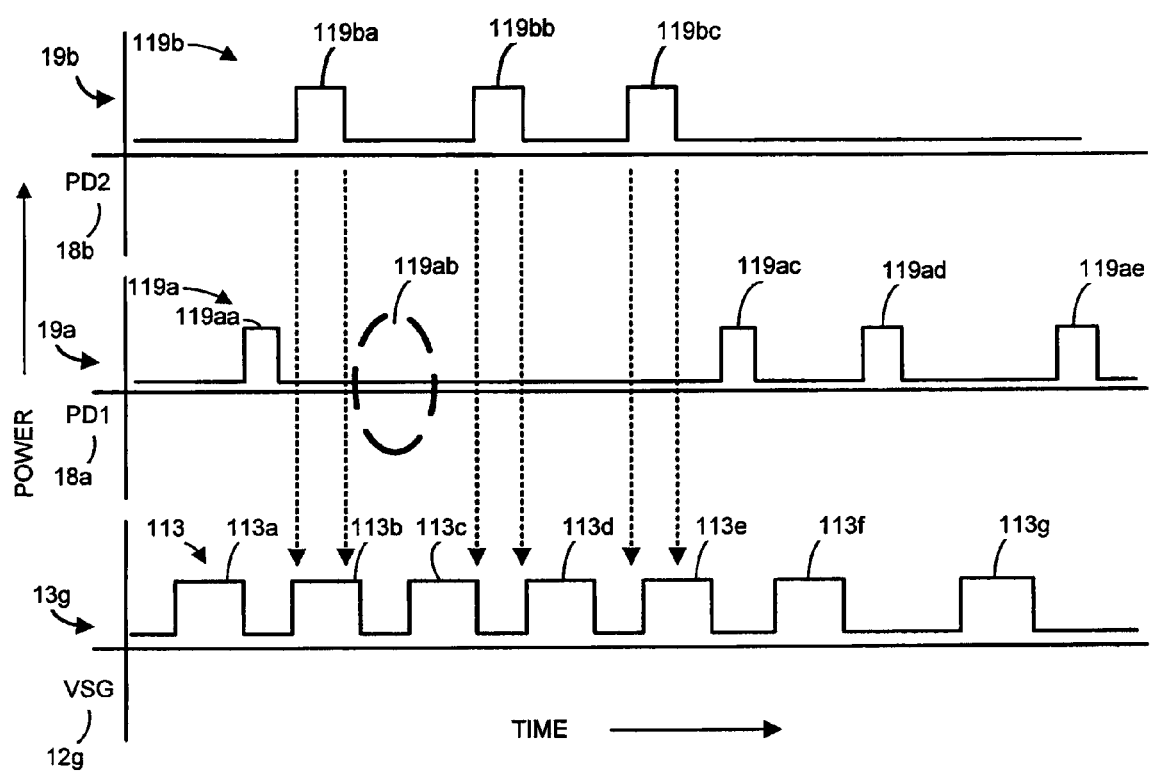
FIG. 2 is a signal timing diagram for exemplary signals produced when testing a data packet signal transceiver device under test (DUT) in the presence of signal interference from one or more other DUTs in accordance with an exemplary embodiment of the presently claimed invention.

Referring to FIG. 2, exemplary signals during use of the testing environment 10 of FIG. 1 would appear as shown. In this example, the tester signal source 12g provides a DUT receive RX signal 13g, initially containing a pre-determined number of test data packets 113a, 113b, . . . , 113f for testing the first DUT 22a (e.g., for purposes of a PER test). Accordingly, the signal routing circuitry 14 is configured so as to provide a direct signal connection between the tester 12 and first DUT 22a. Meanwhile, the other DUTs 22b, 22c, 22d can be otherwise occupied, such as initiating data packet transmissions to allow output signal power levels to settle at steady state levels while receive testing of another DUT 22 is completed, being programmed for the next test, being physically connected to the testing environment 10, or being physically disconnected or removed from the testing environment 10, etc.

In response to these tested data packets 113, e.g., as part of a prescribed test routine or sequence, the tester 12 is expecting to receive a set 119a of responsive data packets from the DUT 22a. Accordingly, as expected, following transmission of the first test data packet 113a, and its apparently successful reception and capture by the first DUT 22a, the tester receives a responsive data packet 119aa (e.g., an acknowledgement (ACK) signal, as measured by the first power detector 18a) during the subsequent inactive, or non-asserted, state of the test signal 13g. Meanwhile, however, the second DUT 22b has begun transmitting a data packet signal 19b of its own, containing a sequence of transmit data packets 119b (as measured by the second power detector 18b).

During the transmission of the second test data packet 113b by the tester 12, the second DUT 22a also transmits a data packet 119ba. These data packets 113b, 119ba overlap in time, as shown. Subsequently, the expected responsive data packet 119ab from the first DUT 22a is not received by the tester. Accordingly, since the test data packet 113b and second DUT data packet 119ba were transmitted concurrently (as known by the tester 12 and measured by the second power detector 18b and reported to the tester 12 via the controller 20, respectively) and no acknowledgement data packet 119ab was received, it is determined likely that signal interference has occurred. Accordingly, the tester 12 adds another test data packet 113g to its originally scheduled sequence 113 to be transmitted so that the first DUT 22a can have another opportunity to receive and acknowledge enough test data packets 113 to perform an accurate PER test.

Later, following the third test data packet 113c, the second DUT 22b transmits another data packet 119bb. However, this data packet 119bb does not overlap with either of its neighboring test data packets 113c, 113d. Nonetheless, however, even though no responsive data packet is received from the first DUT 22a, no additional test data packet is to be provided, since the detected potential interference (due to the occurrence of the second DUT data packet 119bb) is determined to not likely be a cause of problematic interference with the transmitted test data packet sequence 113, and it is more likely that the first DUT 22a simply failed to correctly receive the third test data packet 113c.

Later still, following transmission of the fourth test data packet 113d, again no responsive data packet from the first DUT 22*a* is received. However, no additional test data packet is added to the test data packet sequence 113, since no potentially interfering data packet from the second DUT 22*b* has been detected.

Later again, following transmission of the next test data packet 113*e*, a responsive data packet 119*ac* from the first DUT 22*a* is received, notwithstanding detection of a potentially interfering data packet 119*bc* transmitted substantially coincidentally from the second DUT 22*b*. Since a responsive data packet 119*ac* has been received, it is determined (again, by the tester 12 based on data provided by the first power detector 18*a* via the controller 20) that no problematic interference has occurred. (For example, the measured potentially interfering signal could have originated from a different DUT with a lower interfering signal level or from another DUT at a different signal frequency.)

Subsequently, following transmission of the last original test data packet 113*f* and additional test data packet 113*g*, corresponding responsive data packets 119*ad*, 119*ae* are received and no further interference is detected. Accordingly, the test is now complete and notwithstanding earlier interference resulting in potentially misidentified packet errors, accurate test results are obtained at the cost of minimal additional test time. In this particular example, a PER of $1/6$ will be reported at the cost of only one additional test data packet interval, as compared to an erroneous PER of $2/6$ being reported absent a repetition of the full test cost of at least six test data packet intervals.

Accordingly, so long as the test data packets are uncorrelated and a full complement of N packets are tested with no interference present or the test data packets produce responsive data packets when possible interference is detected, the results should be the same from a statistical perspective as testing the full complement of N data packets with no interference present.

The foregoing discussion has referred to embodiments that use signal power detection subsystems between the DUTs and the tester to monitor the DUT transmit (TX) signals and identify respective times of packet start, cessation and duration. However, it should be understood that such subsystems can be other forms of signal detection subsystems, i.e., they need not necessarily measure the power of a signal to detect the signal. For example, alternative signal detection subsystems can include, without limitation, those that detect signal voltage or signal current, as well as those that include frequency selectivity (e.g., using low pass, high pass and/or band pass filters) so as to be able to detect in-band signals, which are likely to introduce harmful interference, and out-of-band signals, which are not likely to introduce harmful interference. Such a frequency selective signal detection subsystem can include a separate, or dedicated, data packet signal receiver (e.g., in the form of an integrated circuit, or "chip", based receiver) having the desired signal sensitivity and frequency selectivity, and which can also discern the channel within which a potentially interfering signal appears (see, e.g., U.S. patent application Ser. No. 13/467,518, the contents of which are incorporated herein by reference).

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a system for testing multiple wireless data packet signal transceiver devices under test (DUTs) with dynamic signal interference compensation, comprising:

a plurality of data packet signal paths for communicating with a plurality of DUTs by conveying a corresponding plurality of transmit data packet signals from said plurality of DUTs and a receive data packet signal to said plurality of DUTs, and including signal routing circuitry responsive to one or more path control signals by conveying, via a selected one of said plurality of data packet signal paths, a selected one of said plurality of transmit data packet signals from a selected one of said plurality of DUTs and conveying said receive data packet signal to said selected one of said plurality of DUTs, and signal measurement circuitry coupled to said signal routing circuitry and responsive to said plurality of transmit data packet signals by providing one or more measurement signals indicative of reception of respective ones of said plurality of transmit data packet signals; and test circuitry coupled to said plurality of data packet signal paths to receive said plurality of transmit data packet signals and provide said receive data packet signal with at least a predetermined number of data packets, and responsive to said one or more measurement signals by including one or more additional data packets in said receive data packet signal following said one or more measurement signals being indicative of reception, substantially coincident with a current data packet of said receive data packet signal, of at least one data packet of one or more of said plurality of transmit data packet signals from other than said selected one of said plurality of DUTs, and a failure to receive a data packet of said selected one of said plurality of transmit data packet signals corresponding to said current data packet of said receive data packet signal.

2. The apparatus of claim 1, wherein said one or more measurement signals is indicative of at least one of a start, duration and cessation of each one of said plurality of transmit data packet signals.

3. The apparatus of claim 1, wherein said test circuitry is responsive to said one or more measurement signals by including one additional data packet in said receive data packet signal for an occurrence of both:

said one or more measurement signals being indicative of reception, substantially coincident with a current data packet of said receive data packet signal, of at least one data packet of one or more of said plurality of transmit data packet signals from other than said selected one of said plurality of DUTs; and a failure to receive a data packet of said selected one of said plurality of transmit data packet signals corresponding to said current data packet of said receive data packet signal.

4. The apparatus of claim 1, wherein said test circuitry is further responsive to said one or more measurement signals by refraining from including an additional data packet in said receive data packet signal for an occurrence of only one of:

said one or more measurement signals being indicative of reception, substantially coincident with a current data packet of said receive data packet signal, of at least one data packet of one or more of said plurality of transmit data packet signals from other than said selected one of said plurality of DUTs; and a failure to receive a data packet of said selected one of said plurality of transmit data packet signals corresponding to said current data packet of said receive data packet signal.

5. The apparatus of claim 1, wherein said respective portion of said selected one of said plurality of transmit data packet signals corresponding to each portion of said receive data packet signal conveyed to said selected one of said plurality of DUTs comprises an acknowledgment data packet.

6. The apparatus of claim 1, wherein said plurality of data packet signal paths comprises a plurality of conductive radio frequency (RF) signal connections.

7. The apparatus of claim 1, wherein said signal routing circuitry comprises at least one of a radio frequency (RF) signal multiplexor and RF signal switch.

8. The apparatus of claim 1, wherein said signal measurement circuitry comprises at least one of a radio frequency (RF) signal power sensor, RF signal power meter and a data packet signal receiver.

9. The apparatus of claim 1, wherein said test circuitry comprises at least one of a vector signal generator (VSG) and vector signal analyzer (VSA).

10. A method of testing multiple wireless data packet signal transceiver devices under test (DUTs) with dynamic signal interference compensation, comprising:
  providing a plurality of data packet signal paths for communicating with a plurality of DUTs by conveying a corresponding plurality of transmit data packet signals from said plurality of DUTs and a receive data packet signal to said plurality of DUTs;
  responding to one or more path control signals by conveying, via a selected one of said plurality of data packet signal paths, a selected one of said plurality of transmit data packet signals from a selected one of said plurality of DUTs and conveying said receive data packet signal to said selected one of said plurality of DUTs;
  responding to said plurality of transmit data packet signals by providing one or more measurement signals indicative of reception of respective ones of said plurality of transmit data packet signals;
  receiving said plurality of transmit data packet signals;
  providing said receive data packet signal with at least a predetermined number of data packets; and
  responding to said one or more measurement signals by including one or more additional data packets in said receive data packet signal following
    said one or more measurement signals being indicative of reception, substantially coincident with a current data packet of said receive data packet signal, of at least one data packet of one or more of said plurality of transmit data packet signals from other than said selected one of said plurality of DUTs, and
    a failure to receive a data packet of said selected one of said plurality of transmit data packet signals corresponding to said current data packet of said receive data packet signal.

11. The method of claim 10, wherein said one or more measurement signals is indicative of at least one of a start, duration and cessation of each one of said plurality of transmit data packet signals.

12. The method of claim 10, wherein said responding to said one or more measurement signals by including one or more additional data packets in said receive data packet signal comprises responding to said one or more measurement signals by including one additional data packet in said receive data packet signal for an occurrence of both:
  said one or more measurement signals being indicative of reception, substantially coincident with a current data packet of said receive data packet signal, of at least one data packet of one or more of said plurality of transmit data packet signals from other than said selected one of said plurality of DUTs; and
  a failure to receive a data packet of said selected one of said plurality of transmit data packet signals corresponding to said current data packet of said receive data packet signal.

13. The method of claim 10, further comprising responding to said one or more measurement signals by refraining from including an additional data packet in said receive data packet signal for an occurrence of only one of:
  said one or more measurement signals being indicative of reception, substantially coincident with a current data packet of said receive data packet signal, of at least one data packet of one or more of said plurality of transmit data packet signals from other than said selected one of said plurality of DUTs; and
  a failure to receive a data packet of said selected one of said plurality of transmit data packet signals corresponding to said current data packet of said receive data packet signal.

14. The method of claim 10, wherein said respective portion of said selected one of said plurality of transmit data packet signals corresponding to each portion of said receive data packet signal conveyed to said selected one of said plurality of DUTs comprises an acknowledgment data packet.

15. The method of claim 10, wherein said providing a plurality of data packet signal paths comprises providing a plurality of conductive radio frequency (RF) signal connections.

16. The method of claim 10, wherein said responding to one or more path control signals by conveying, via a selected one of said plurality of data packet signal paths, a selected one of said plurality of transmit data packet signals from a selected one of said plurality of DUTs and conveying said receive data packet signal to said selected one of said plurality of DUTs comprises conveying said selected one of said plurality of transmit data packet signals and said receive data packet signal via at least one of a radio frequency (RF) signal multiplexor and RF signal switch.

17. The method of claim 10, wherein said responding to said plurality of transmit data packet signals by providing one or more measurement signals indicative of reception of respective ones of said plurality of transmit data packet signals comprises measuring signal powers of respective ones of said plurality of transmit data packet signals.

18. The method of claim 10, wherein:
  said receiving said plurality of transmit data packet signals comprises receiving said plurality of transmit data packet signals with a vector signal analyzer (VSA); and
  said providing said receive data packet signal comprises providing said receive data packet signal with a vector signal generator (VSG).

* * * * *